United States Patent Office 3,248,172
Patented Apr. 26, 1966

3,248,172
PREPARATION OF PHOSPHORUS FLUORIDES
Franciszek Olstowski, Freeport, Tex., assignor to The Dow Chemical Company, Midland, Mich., a corporation of Delaware
No Drawing. Filed July 17, 1962, Ser. No. 210,562
6 Claims. (Cl. 23—203)

This invention relates to the preparation of fluorinated phosphorus compounds and more particularly is concerned with a process for preparing binary phosphorus fluorides and multi-component fluorine and phosphorus containing compounds by reacting a binary phosphorus halide or multi-component halogen and phosphorus containing compound with an alkali metal fluosilicate. Fluorinated phosphorus compounds produced by the present novel process include, for example, phosphorus (V) fluoride ($PF_5$), phosphorus (V) oxyfluoride ($POF_3$), phosphorus (III) trifluoride ($PF_3$) phosphorus (V) thio-fluoride ($PSF_3$) and the like.

The reaction of $PCl_5$ with $CaF_2$ to produce $PF_5$ is known (Lange and Krueger, Ber., vol. 65, 1253 (1932), and U.S. Patent 2,884,467). However, Lange and Krueger in the Ber. article report that the reaction of an alkali metal fluoride with $PCl_5$ does not produce $PF_5$ but rather yields the alkali metal hexafluorophosphate salt.

The reaction of $POCl_3$ with NaF to yield $POF_3$ has been shown in U.S. Patent 2,928,720, but allegedly for this reaction to proceed it must be carried out in a solvent having a dielectric constant of at least 20.

Now unexpectedly, the present invention provides a process for preparing fluorinated phosphorus compounds at relatively low temperatures using safe to handle, non-corrosive, relatively low toxicity alkali metal fluosilicates as fluorinating agents.

It is a principal object of the present invention to provide a low temperature process for preparing fluorinated phosphorus compounds by reacting an alkali metal fluosilicate and a binary phosphorus halide or multi-component halide-phosphorus containing compound.

It is another object of the present invention to provide an economical process for preparing binary phosphorus fluorides or multi-component fluorine-phosphorus containing compounds employing relatively low cost byproduct fluosilicates as a fluorination source.

It is a further object of the present invention to provide a process for preparing fluorinated phosphorus compounds that does not require the use of a solvent.

These and other objects and advantages will become apparent from the detailed description presented hereinafter.

In accordance with the present process, an alkali metal fluosilicate is reacted with a binary phosphorus halide, phosphorus oxyhalide (phosphoryl halide), phosphorus thiohalide (thiophosphoryl halide) or posphorus halonitride, and preferably a binary phosphorus chloride, at a temperature of from about 50 to about 400° C. employing a molar (gram-mole) ratio of alkali metal fluosilicate/binary phosphorus halide or multi-component halogen containing phosphorus compound of from about 5 to about 0.3 based on that required for stoichiometric reaction between the fluosilicate and the phosphorus halogen containing compound. The terms "stoichiometric" or "stoichiometric ratio" as used herein refer to the complete replacement of the halogen of the binary phosphorus halide or multi-component halogen containing phosphorus compound with fluoride from the alkali metal fluosilicate.

Preferably the reaction is carried out over a temperature range of from about 50° C. to about 400° C. using a stoichiometric ratio of reactants, i.e. alkali metal fluosilicate to binary phosphorus halide or multi-component halogen containing phosphorus compound wherein there is a fluorine for replacement of each halogen of the phosphorus compound.

The term halide as used herein with reference to the phosphorus reactant materials refers to chloro-, bromo- and iodo substituted phosphorus compounds.

If desired a small amount of an acidic, substantially anhydrous fluosilicate decomposition catalyst, e.g. $FeCl_3$, $SbCl_5$, $CrCl_3$, HCl and the like, or mixtures thereof can be added to the reaction mixture. The use of such reaction promoters has been found to markedly promote the reaction rate when halogenated phosphorus compounds other than phosphorus pentachloride is used as reactant. Ordinarily from about 1 to about 10 weight percent of the reaction promoter catalyst based on the total reaction mixture is employed.

The process ordinarily is carried out at atmospheric pressure although superatmospheric pressures of up to 10 atmospheres or more can be employed.

The process can be carried out in batch-type or continuous operation employing reactor equipment and material handling techniques known to one skilled in the art.

The materials of construction to be used in the processing equipment for carrying out the present process are those which are substantially inert to the reactants and products and have the requisite structural strength and physical characteristics to withstand the temperatures and pressures employed in the process. Nickel, stainless steel, nickel lined and stainless steel lined equipment are especially suitable for use in the present process.

Ordinarily either sodium fluosilicate or potassium fluosilicate is used as a fluorinating agent because of the relatively low cost and ready availability. However, if desired the other alkali meal fluosilicates, i.e. lithium fluosilicate ($Li_2SiF_6$), cesium fluosilicate ($Cs_2SiF_6$) or rubidium fluosilicate ($Rb_2SiF_6$) can be employed in the present process.

The phosphorus halogen containing reactant can be selected from binary compounds, i.e. $PCl_5$, $PCl_2$, $PBr_5$, $PI_3$ or $PBr_3$ for example, or can be a multi-component compound such as $POCl_3$, $POBr_3$, $PSCl_3$, $P_3N_3Cl_3$ etc.

In the production of binary phosphorus fluorides or multi-component fluorine-phosphorus containing compounds by the present process, silicon tetrafluoride results as a co-product. This readily can be collected and converted to the fluosilicic acid ($H_2SiF_6$) by reaction with water. Reaction of this acid with alkali metal chloride, e.g. sodium chloride, regenerates the corresponding alkali metal fluosilicate which can be recycled for additional reaction.

This process provides a way for producing fluorinated phosphorus compounds wherein the halide, i.e. chloride, bromide or iodide of the halogen containing phosphorus reactant is completely substituted by fluoride as well as for producing partially fluoro substituted halides.

The following examples will serve further to illustrate the present invention but are not meant to limit it thereto.

*Example 1*

A mixture of about 17 grams $PCl_5$ (about 0.08 gram-mole) and about 37 grams of $Na_2SiF_6$ (about 0.2 gram-mole), i.e., a $Na_2SiF_6/PCl_5$ ratio of about 2.5, was added to a tubular nickel reactor having an inside diameter of about 1 inch and about 10 inches long. The reactor had a transfer tube attached to one end whereby product gases were transported to a stainless steel receiver.

The reactor was placed in an electrically heated furnace and the furnace temperature slowly raised. As the furnace temperature reached about 60° C. a perceptible gas evolution was observed. This become rapid as the temperature reached about 76° C. Infrared analysis of the product gases indicated these contained $SiF_4$, $POF_3$ and $PF_5$. The reaction was continued over an additional two hour period during which time the furnace temperature slowly was increased to about 120° C. During the entire run, the reactor was maintained at about atmospheric pressure. After the two hour period, the reaction was discontinued. The collected gaseous products obtained from the reaction indicated the following composition upon infrared analysis:

| | Mol percent |
|---|---|
| $PF_5$ | 27 |
| $POF_3$ | 5.4 |
| $SiF_4$ | 67.5 |

In a second run, about 40 grams of $Na_2SiF_6$ (about 0.21 gram-mole) was reacted with about 21 grams $PCl_5$ (about 0.1 gram-mole), i.e., a $Na_2SiF_6/PCl_5$ ratio of about 2.1. Gas evolution occurred at about 50° C.; infrared analysis showed the product gases consisted essentially of $SiF_4$ and $POF_3$. Analysis of the product gases at a reaction bed temperature of about 72° C. indicated these consisted primarily of $PF_5$, $SiF_4$ and some $POF_3$. The reaction was continued for about 1¼ hours additionally after this time during which period the reaction bed temperature increased to about 100° C.

Wet chemical analysis of the solid residue from the reaction indicated about 60 percent conversion of the sodium fluosilicate charged. X-ray analysis of the solid residue indicated the presence of NaCl and unreacted $Na_2SiF_6$.

*Example 2*

About 56 grams of $Na_2SiF_6$ (~0.3 gram-mole) and about 25 grams of $POCl_3$ (~0.16 gram-mole), i.e., a $Na_2SiF_6/POCl_3$ ratio of about 1.9, were mixed together and placed in the reactor described in Example 1. The reactor was heated to the reflux temperature of $POCl_3$ about 105° C. at 1 atmosphere. A very slow gas evolution was observed indicating a low rate of conversion.

In a second run, about 38 grams of $Na_2SiF_6$ (~0.2 gram-mole), about 16.7 grams of $POCl_3$ (~0.11 gram-mole), i.e., a $Na_2SiF_6/POCl_3$ ratio of about 1.8, and about 2 grams of substantially anhydrous $FeCl_3$ as a fluosilicate decomposition catalyst were placed in the tubular nickel reactor. This quantity of $FeCl_3$ is about 3.5 percent of the total composition. Upon heating at atmospheric pressure to the reflux temperature of $POCl_3$, a rapid gas evolution occurred. This product upon infrared analysis indicated the presence of $SiF_4$ and $POF_3$.

After about 2 hours reaction at about 105° C., the run was discontinued and the solid residue analyzed by chemical wet methods for silicon and sodium. The results of this analysis indicated that approximately 69.5% of the $Na_2SiF_6$ reactant had been converted during the reaction period.

*Example 3*

About 38 grams of $Na_2SiF_6$ (~0.2 gram-mole), about 15.7 grams of $PCl_3$ (~0.11 gram-mole), i.e., a $Na_2SiF_6/PCl_3$ ratio of about 1.8, and about 2 grams of substantially anhydrous $FeCl_3$ fluosilicate decomposition catalyst were mixed and added to the reactor described in Example 1. This quantity of $FeCl_3$ is about 3.6 percent of the total composition. The reaction mixture was heated at the reflux temperature of $PCl_3$, about 76° C., at atmospheric pressure at which temperature a rapid gas evolution took place. Infrared analysis of the product gases indicated the presence of $PF_3$, $POF_3$ and $SiF_4$ wherein the $PF_3/POF_3$ ratio was about 4.

In a manner similar to that shown for the foregoing examples, $K_2SiF_6$ can be reacted with $PBr_5$ to give $PF_5$. Likewise, $Na_2SiF_6$ can be admixed with $PSCl_3$ and the mixture heated at about 350° C. to prepare $PSF_3$, $PSF_2Cl$ and $PSFCl_2$. Also $RbSiF_6$ can be reacted with $POCl_3$ in the presence of substantially anhydrous $CrCl_3$ to prepare $POF_3$, $POF_2Cl$ and $POFCl_2$. $K_2SiF_6$ can be reacted with $P_3N_3Cl_3$ within the temperature range set forth herein to prepare $P_3N_3F_3$. $PI_3$ and $Na_2SiF_6$ also can be reacted in the presence of $FeCl_3$ to yield phosphorus fluorides. Additionally $Na_2SiF_6$ can be heated with a mixture of $PCl_5$ and $POCl_3$ to prepare a mixture of the corresponding phosphorus fluoride compounds.

Various modifications can be made in the present invention without departing from the spirit or scope thereof for it is understood that I limit myself only as defined in the appended claims.

I claim:

1. A process for preparing fluorinated phosphorus compounds which comprises,
   (a) reacting, at a temperature within the range of from about 50 to about 400° C., at which gaseous fluorinated phosphorus compounds are produced, an alkali metal fluosilicate with a phosphorus-halogen containing compound member selected from the group consisting of binary phosphorus halides, phosphoryl halides, thiophosphoryl halides and phosphorus halonitrides wherein the halogen is a member selected from the group consisting of chlorine, bromine and iodine, the molar ratio of said alkali metal fluosilicate to said phosphorus-halogen containing compound being from about 5 to about 0.3 based on that required for stoichiometric reaction between said alkali metal fluosilicate and said phosphorus-halogen containing compound, and
   (b) removing gaseous fluorinated phosphorus products from the residual solid reaction mixture.

2. The process as defined in claim 1 wherein the process is carried out at a temperature of from about 75° C. to about 250° C., the alkali metal fluosilicate is a member selected from the group consisting of sodium fluosilicate and potassium fluosilicate and the halogen member of the phosphorus-halogen containing compound is chlorine.

3. The process as defined in claim 1 where in from about 1 to about 10 weight percent of substantially anhydrous ferric chloride is incorporated into the reaction mass.

4. A process for preparing binary phosphorus (V) fluoride which comprises; providing a mixture of binary phosphorus (V) chloride and sodium fluosilicate, said mixture having a $Na_2SiF_6/PCl_5$ ratio of about 2 on a molar basis and heating said mixture at a temperature of from about 60° to about 120° C. and removing gaseous phosphorus (V) fluoride product from the residual solid reaction mixture.

5. A process for preparing phosphorus (III) oxyfluoride which comprises;
   (1) providing a reaction mixture of phosphorus (III) oxychloride and sodium fluosilicate, said mixture having a $Na_2SiF_6/POCl_3$ molar ratio of about 2 and said mixture having about 3.5 weight percent of substantially anhydrous $FeCl_3$ in corporated therein,
   (2) heating said mixture at about 105° C. and removing gaseous phosphorus (III) oxyfluoride product from the residual solid reaction mixture.

6. A process for preparing binary phosphorus (III) fluoride which comprises;
   (1) providing a reaction mixture of binary phosphorus (III) chloride and sodium fluosilicate, said mixture having a $Na_2SiF_6/PCl_3$ molar ratio of about 2 and said mixture having about 3.6 weight percent of substantially anhydrous $FeCl_3$ incorporated therein and,
   (2) heating said mixture at a temperature of about 76° C. and removing the gaseous phosphorus (III) fluoride product from the residual solid reaction mixture.

References Cited by the Examiner

UNITED STATES PATENTS

| | | | |
|---|---|---|---|
| 2,884,467 | 4/1959 | Denison | 260—653.3 |
| 2,877,096 | 3/1959 | Brinker | 23—203 XR |
| 2,928,720 | 3/1960 | Tullock | 23—203 XR |
| 2,933,374 | 4/1960 | Cook et al. | 23—204 |
| 3,026,179 | 3/1962 | Smith | 23—203 |

FOREIGN PATENTS

| | | |
|---|---|---|
| 550,928 | 12/1957 | Canada. |
| 814,139 | 9/1951 | Germany. |

BENJAMIN HENKIN, *Primary Examiner.*

MAURICE A. BRINDISI, *Examiner.*